US007905311B2

(12) United States Patent
Brown

(10) Patent No.: US 7,905,311 B2
(45) Date of Patent: Mar. 15, 2011

(54) FORK LIFT TRUCK WITH A SINGLE FRONT WHEEL

(75) Inventor: Frederick Leslie Brown, Stratford-Upon-Avon (GB)

(73) Assignee: Translift Bendi Limited, Worcestershire (GB)

( * ) Notice: Subject to any disclaimer, the term of this patent is extended or adjusted under 35 U.S.C. 154(b) by 124 days.

(21) Appl. No.: 10/555,921

(22) PCT Filed: May 26, 2004

(86) PCT No.: PCT/GB2004/002242

§ 371 (c)(1), (2), (4) Date: Nov. 4, 2005

(87) PCT Pub. No.: WO2004/106216

PCT Pub. Date: Dec. 9, 2004

(65) Prior Publication Data

US 2006/0228204 A1 Oct. 12, 2006

(30) Foreign Application Priority Data

May 30, 2003 (GB) .................................. 0312343.7

(51) Int. Cl.
*B62D 61/08* (2006.01)

(52) U.S. Cl. ......... 180/210; 280/834; 187/238; 414/633

(58) Field of Classification Search .................. 280/834; 180/210, 233, 246, 418, 416; 414/633, 632; 187/224, 226, 236–238
See application file for complete search history.

(56) References Cited

U.S. PATENT DOCUMENTS

| | | | | | |
|---|---|---|---|---|---|
| 2,196,634 | A | * | 4/1940 | Kuert | 187/235 |
| 2,284,237 | A | | 5/1942 | Stevenson | |
| 2,613,828 | A | * | 10/1952 | Elliott et al. | 414/633 |
| 2,986,295 | A | | 5/1961 | Shaffer | |
| 3,151,694 | A | | 10/1964 | Rogers | |
| 3,225,949 | A | | 12/1965 | Erickson et al. | |
| 3,272,365 | A | | 9/1966 | Stevens | |
| 3,342,282 | A | | 9/1967 | Forpahl | |
| 3,468,390 | A | | 9/1969 | Schultz | |
| 3,524,512 | A | * | 8/1970 | Barnowsky et al. | 180/14.1 |
| 3,893,580 | A | | 7/1975 | Stevens | |
| 4,135,597 | A | | 1/1979 | Barth | |
| 4,424,872 | A | * | 1/1984 | Granlind et al. | 180/24.02 |
| 4,778,020 | A | * | 10/1988 | Hagin et al. | 180/53.4 |
| 5,215,166 | A | * | 6/1993 | Pipes | 187/238 |
| 5,312,219 | A | * | 5/1994 | Brown | 414/633 |
| 6,595,329 | B1 | * | 7/2003 | Gotz | 187/228 |
| 7,163,088 | B2 | * | 1/2007 | Jahns et al. | 187/222 |
| 2002/0050416 | A1 | * | 5/2002 | Brown | 180/246 |

(Continued)

FOREIGN PATENT DOCUMENTS

DE 1049307 1/1959

(Continued)

*Primary Examiner* — Joanne Silbermann
*Assistant Examiner* — Maurice Williams
(74) *Attorney, Agent, or Firm* — Davis & Bujold, P.L.L.C.

(57) ABSTRACT

A fork lift truck (10) has a truck body (12), a lift mechanism (14) connected to the truck body (12) by means of a vertically extending pivot (52) and means (24) for turning the lift mechanism (14) relative to the truck body (12) about said pivot (52) to steer the truck (10), the truck body (12) having a pair of rear ground engaging wheels (16) mounted on transverse axes, the lifting mechanism (14) having a single ground engaging front wheel (40) mounted centrally on a transverse axis, the front wheel (40) having independent drive means (44, 46).

12 Claims, 7 Drawing Sheets

U.S. PATENT DOCUMENTS

| | | | | |
|---|---|---|---|---|
| 2002/0088665 | A1* | 7/2002 | Brown | 180/418 |
| 2003/0132038 | A1* | 7/2003 | Callan et al. | 180/6.24 |
| 2004/0011572 | A1* | 1/2004 | Harty | 180/6.2 |

FOREIGN PATENT DOCUMENTS

| | | |
|---|---|---|
| DE | 1209450 | 1/1966 |
| DE | 29710645 | 10/1997 |
| EP | 0 855 362 | 7/1998 |
| EP | 1 201 596 | 5/2002 |
| EP | 1201596 | 5/2002 |
| EP | 1 223 142 | 7/2002 |
| FR | 1510019 | 1/1968 |
| GB | 961653 | 6/1964 |
| GB | 1427194 | 3/1976 |
| GB | 2 234 214 | 1/1991 |
| GB | 2234214 | 1/1991 |
| GB | 2 255 941 | 11/1992 |
| GB | 2 263 088 | 7/1993 |
| GB | 2 265 344 | 9/1993 |
| GB | 2321049 | 7/1998 |
| GB | 2356611 | 5/2001 |
| GB | 2 383 984 | 7/2003 |
| JP | 226699 | 9/1989 |

* cited by examiner

FORK LIFT TRUCK WITH A SINGLE FRONT WHEEL

This application is a national stage completion of PCT/GB2004/002242 filed May 26, 2004 which claims priority from British Application Serial No. 0312343.7 filed May 30, 2003.

FIELD OF THE INVENTION

The present invention relates to fork lift trucks of the kind designed for use in narrow aisles of warehouses and the like, where the truck is to deposit loads in and remove loads from the face of a stack, in a direction transverse to the length of the aisle, that is at right angles to the face of the stack.

BACKGROUND OF THE INVENTION

In order to maximise the storage area of a warehouse, it is desirable to make the aisles of the minimum width possible. The aisles must however be wide enough to permit the manoeuvring of fork lift trucks to deposit a load in or remove a load from the stacks.

In order to improve the manoeuvrability of the fork lift trucks and thus reduce the aisle width, GB 2234214, the disclosure of which is incorporated herein by reference thereto, discloses a fork lift truck with two parts that are pivoted together. The rear part comprises a truck body which carries the driver, propulsion unit and counterweights to balance loads carried by a lifting mechanism mounted on the front part. A pair of driven wheels are provided on the truck body and a pair of non-driven wheels are provided on the front part, as close as possible to the load bearing part of the lift mechanism. The truck is steered by turning the front part relative to the truck body, about the pivot axis.

In order to permit loads to be deposited or removed from the stacks at right angles to the aisles, the front part is preferably capable of being turned at 90° or more to the truck body. As the front wheels approach 90°, the drive from the rear wheels will cause the front wheels to slide sideways along the aisle, rather than steering the truck towards the position in the stack into which a load is to be deposited or from which a load is to be removed.

In order to overcome this problem, it has been proposed, for example as disclosed in GB 2263088 or GB 2255941, the disclosure of which is incorporated herein by reference thereto, to provide differential drive to the rear wheels, in order to produce a steering effect.

A more effective approach, as disclosed in GB 2265344 and EP 1201596, the disclosure of which is incorporated herein by reference thereto, has been to drive the front wheels, instead of or in addition to the rear wheels. However in order to provide stability, it is necessary for the weight distribution in this type of lift truck to be very much to the rear of the truck. It is consequently necessary with front wheel drive systems of this type, to provide an articulated front axle to ensure that both front wheels remain in driving engagement with the floor, in spite of irregularities in the floor surface. This will generate further stability problems, particularly with elevated loads and in practice articulation of the front axle must be limited to provide a maximum upward and downward movement of each wheel, of about 25 mm. Even when the front axle is articulated in this manner, wheel spin is libel to occur if there are variations in the floor surface in excess of 20 mm in 1.5 m, which is typical for a newly laid warehouse floor.

According to one aspect of the present invention, a fork lift truck comprises a truck body, a lift mechanism connected to the truck body by means of a vertically extending pivot and means for turning the lift mechanism relative to the truck body about said pivot to steer the truck, the truck body having a pair of rear ground engaging wheels mounted on transverse axes, the lifting mechanism having a single ground engaging front wheel mounted centrally on a transverse axis, characterised in that the front wheel has independent drive means.

SUMMARY OF THE INVENTION

The present invention provides a front wheel drive fork lift truck which will overcome the steering problems associated with rear wheel drive trucks of this type. Furthermore as the single front wheel will always be in driving engagement with the floor, irrespective of irregularities in the surface of the floor, there is no need for articulation of the front axle and the problems associated therewith.

The front wheel may be driven, for example by a hydraulic or electric motor. The motor is preferably coupled directly to the wheel and the motor or a gearbox associated therewith partially built into the wheel to reduce the bulk and minimise the width of the mechanism. The power source for the wheel motor and also for the steering mechanism by which the lifting mechanism is turned about the pivot and for the lifting mechanism itself, for example a hydraulic pump driven by an engine, an engine driven electrical generator or a battery pack, is housed in the truck body. The rear wheels may also be driven in addition to the front wheel.

In accordance with a preferred embodiment of the invention, the front wheel is mounted centrally on a transverse axis as far forward towards the load bearing part of the lifting mechanism as possible, in order to maximise the load bearing capability of the truck.

BRIEF DESCRIPTION OF THE DRAWINGS

The invention is now described, by way of example only, with reference to the accompanying drawings, in which:—

DETAILED DESCRIPTION OF THE INVENTION

Figure 1:
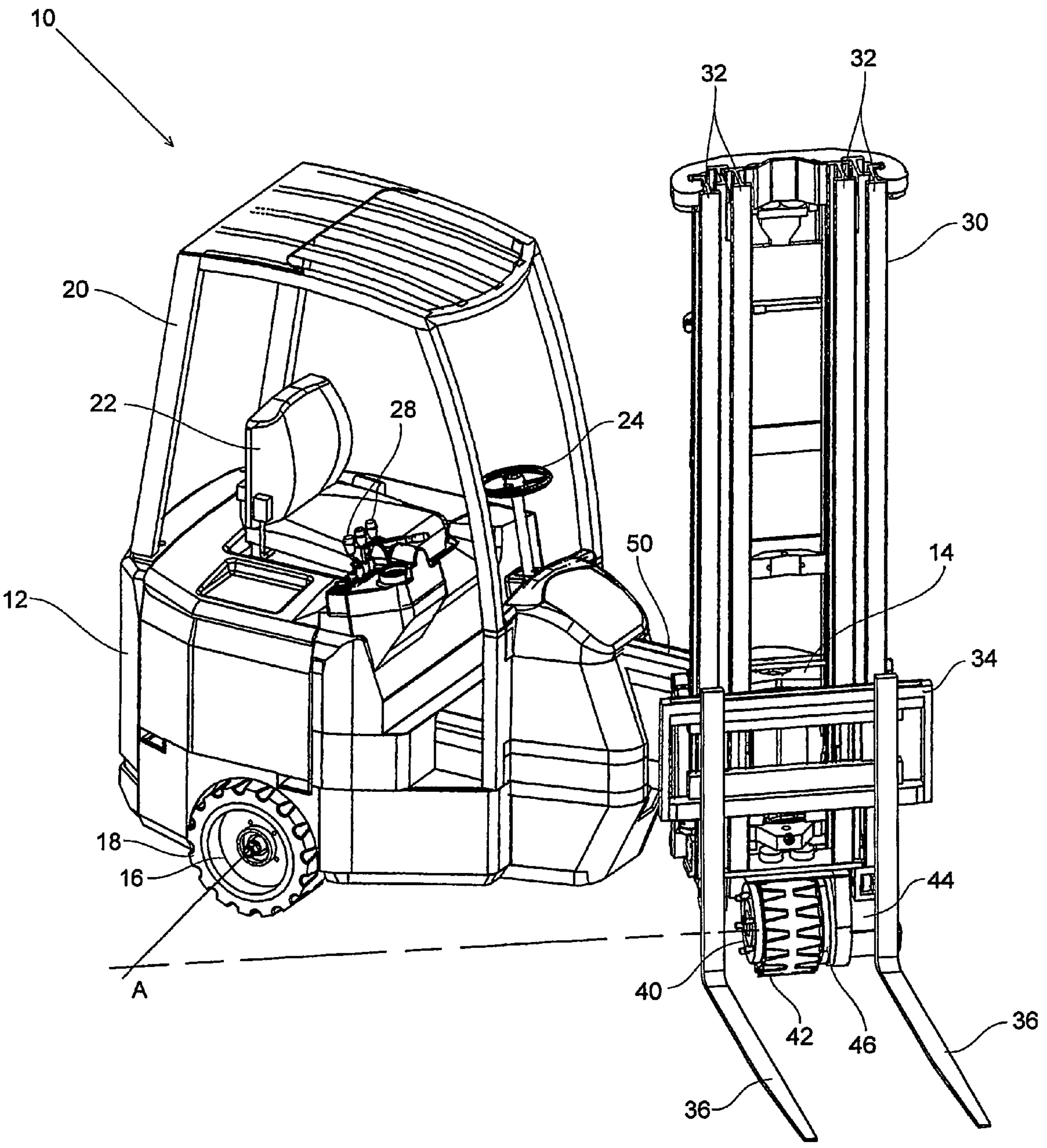
FIG. 1 is a perspective view of one embodiment of a fork lift truck in accordance with the present invention.
Figure 2:
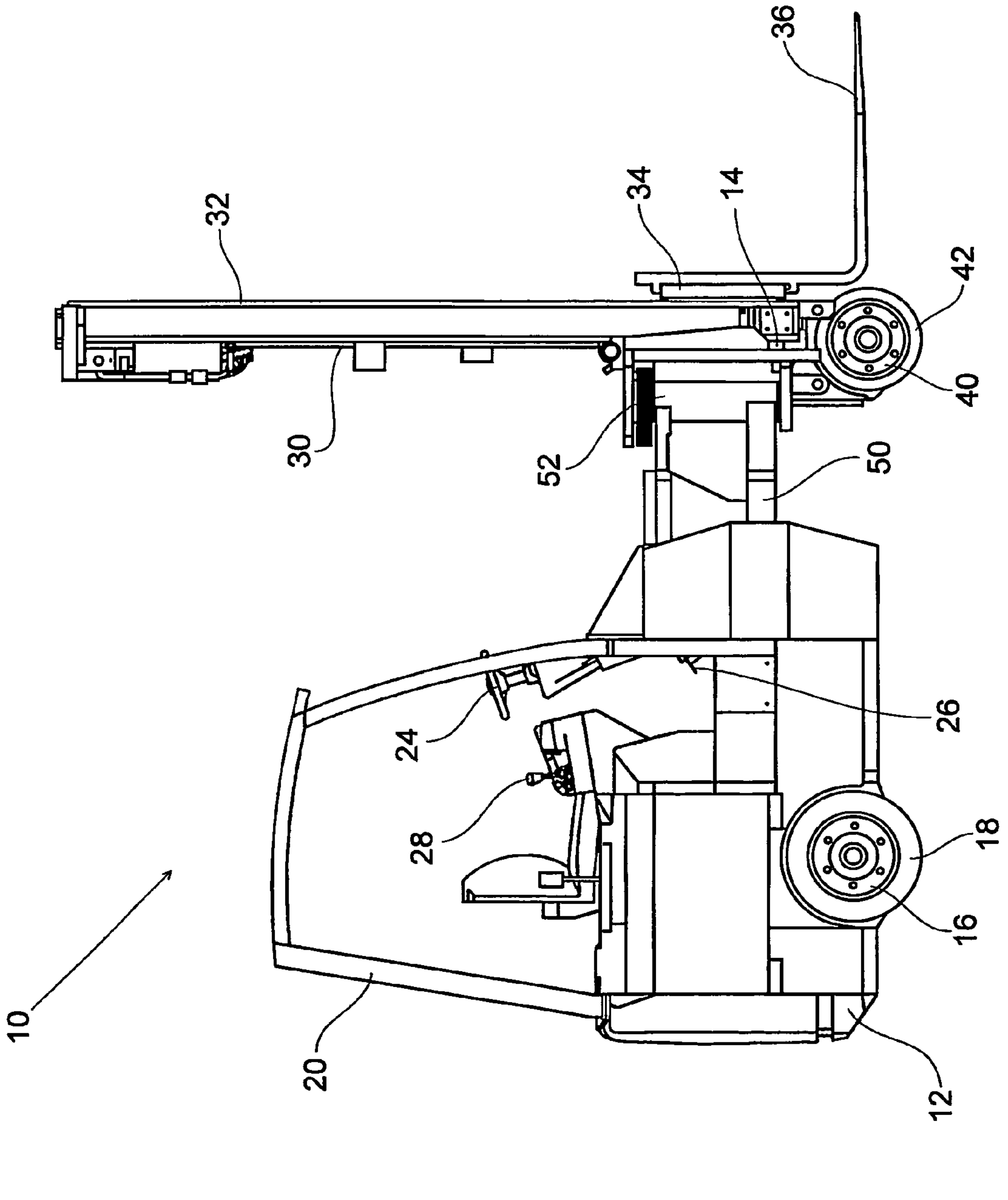
FIG. 2 is a diagrammatic side elevation of the fork lift truck shown in FIG. 1.

As illustrated in FIGS. 1 and 2, a fork lift truck 10 comprises a truck body 12 and lifting mechanism 14.

The truck body 12 has a pair of rear wheels 16 mounted on a common axis, which is transverse to the longitudinal axis of the lift truck. The wheels 16 have solid tires 18. The truck body provides a cabin 20 having a seat 22, steering controls 24, drive control pedals 26 and lifting controls 28. Means, for example, a battery pack or engine driven generator or hydraulic pump, for providing power to the various systems of the truck 10 are also mounted in the truck body 12, together with counter balance weights.

The lifting mechanism 14 comprises a telescopic mast 30 comprising several rails 32, which may be moved in telescopic manner. A fork carriage 34 is mounted on the mast 30 for movement longitudinally of the rails 32. A pair of load engaging forks 36 are provided on the fork carriage 34. Drive means (not shown), for example hydraulic motors or rams, or electric motors are provided for extending the mast and for moving the fork carriage. Furthermore, means, for example a hydraulic ram (not shown) may be provided for tilting the mast 30, backwards from the vertical, in conventional manner.

A single front wheel 40 is mounted on the lifting mechanism 14, on a fixed axle which is transverse to the longitudinal axis of the truck when in the straight ahead position. The front wheel 40 is mounted beneath the mast 30 centrally of the lifting mechanism 14 and as far forward towards the forks 36 as possible, without fouling loads mounted on the forks 36. The wheel 40 has a solid tire 42.

An electric motor 44 is mounted coaxially of the wheel 40 and is coupled to the wheel 40 by means of a gearbox 46 which is built partially into the hub of the wheel 40, in order to reduce the overall width of the wheel 40/motor 44/gearbox 46 unit.

The lifting mechanism 14 is pivotally connected to an arm 50 which extends forwardly from the front of the truck body 12, by means of a vertical bearing tube assembly 52. A steering mechanism, for example a hydraulic or electric motor and gear or chain mechanism, or hydraulic rams (not shown), is provided for turning the lifting mechanism 14 relative to the truck body 12 under control of the steering control 24, in order to steer the fork lift truck 10.

Figure 3:
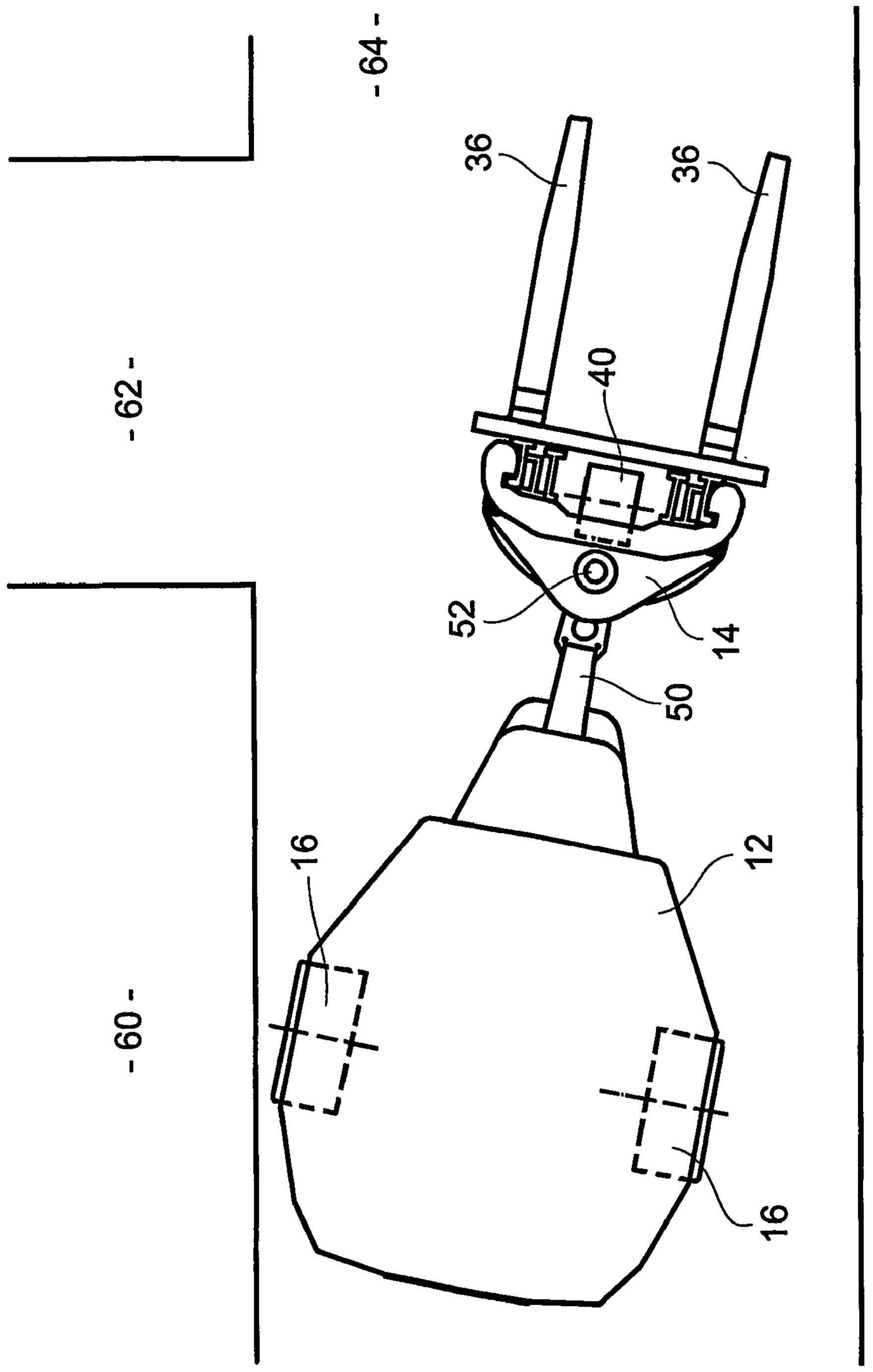
FIGS. 3 to 5 are diagrammatic plan views of the fork lift truck shown in FIG. 1, at various stages of a manoeuvring operation.
Figure 4:
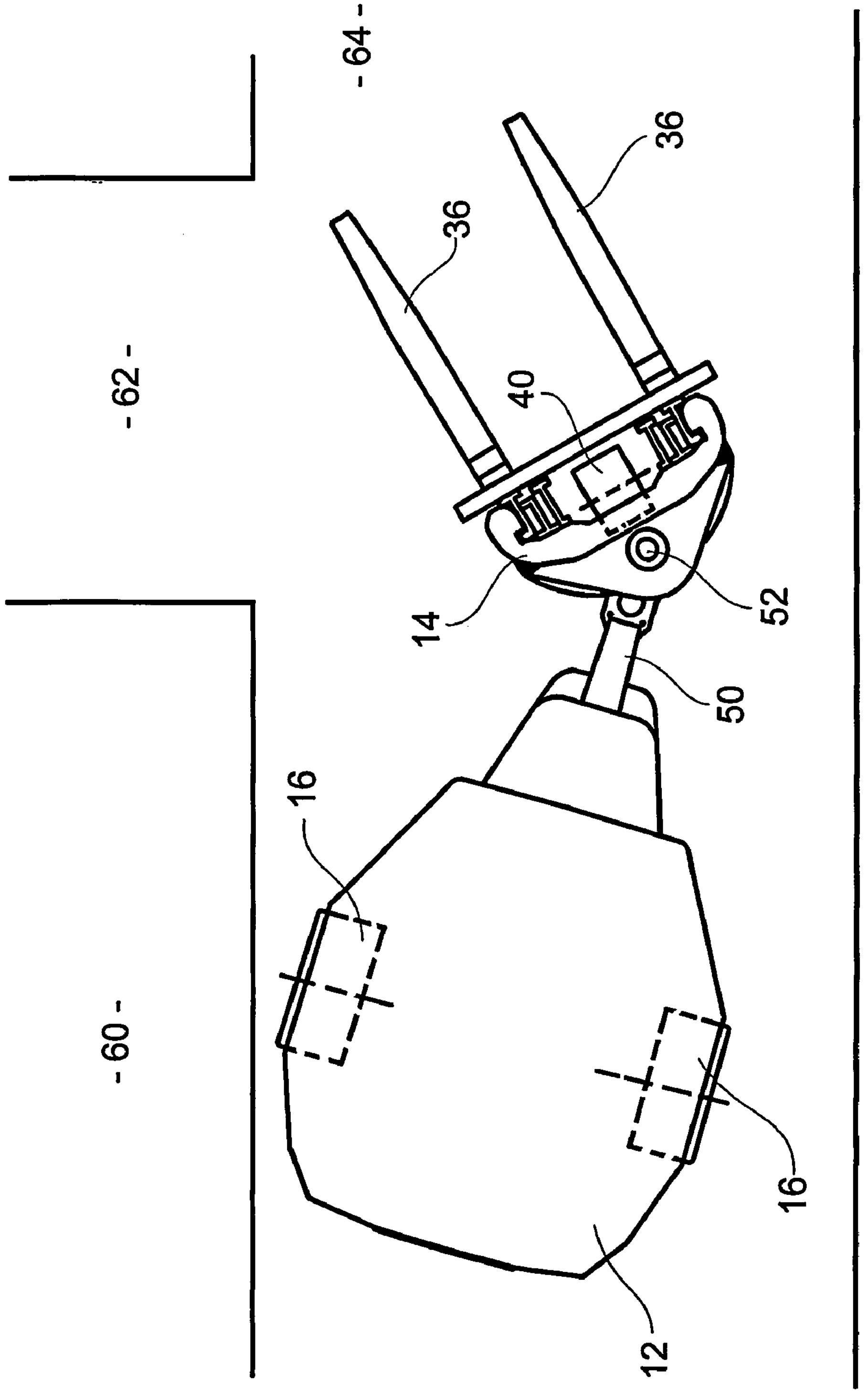
Figure 5:
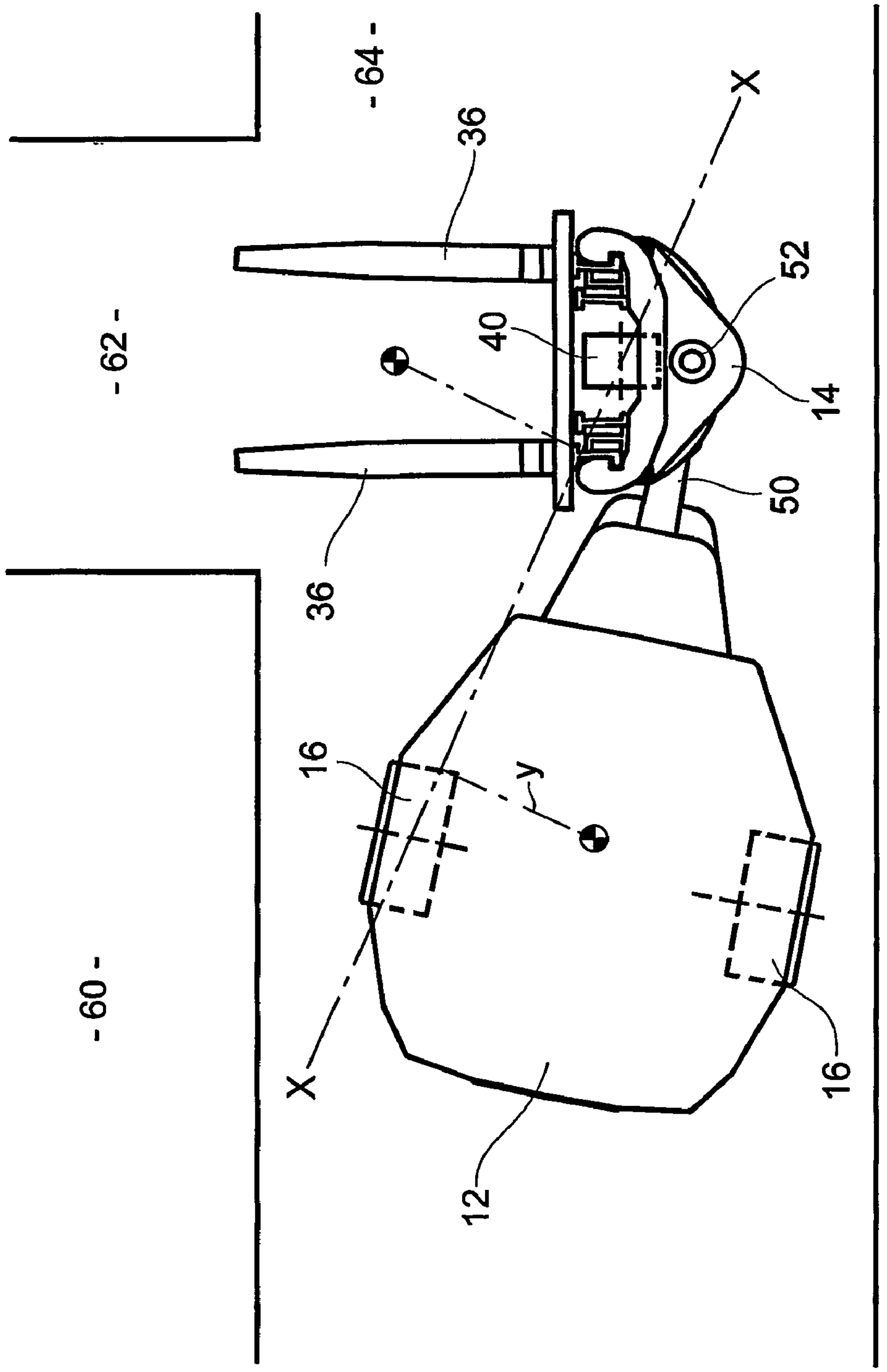

FIGS. 3 to 5 show a typical manoeuvre required to deposit or remove a load in bay 62 of a stack 60. The fork lift truck 10 is driven along an aisle 64 between two stacks 60. With the lifting mechanism 14 in the straight ahead position, similar to that illustrated in FIG. 3. As the truck 10 approaches the bay 62, the truck 10 is manoeuvred by turning lifting mechanism 14, so that the truck body is close into the stack 60 but angled away from the bay 62, as illustrated in FIG. 3. The lifting mechanism 14 is then turned towards the bay 62, while the truck 10 is driven forward by motor 44, so that the forks 36 gradually move into the bay 62, as illustrated in FIG. 4. Eventually the forks 36 are disposed at right angles to the stack 60, as illustrated in FIG. 5. The truck 10 may then be driven by motor 44, while reducing the steering angle, so that the forks 36 enter the bay 62 at right angles to the stack, so that a load mounted thereon may be deposited in the bay 62 or a load may be removed from the bay 62.

The fork lift truck 10 is at its least stable position when the lifting mechanism 14 is positioned at 90° to the line X-X joining the points of contact of the front wheel 40 and inside rear wheel 16 with the ground. In this position the load mounted on the forks 36 will produce a moment about the line X-X. In order to balance the load carried by the truck 10, the centre of gravity of the truck must be positioned as far rearwardly as possible, in order to maximise the distance y between the centre of gravity and line X-X.

As the lifting mechanism 14 is rotated and the truck 10 is driven by the motor 44, the speed of the inside rear wheel 16 will reduce with increasing steering angle, until when the point of intersection A of the axis of the front wheel 40 with the axis of the inside rear wheel 16 coincides with the point of contact of the inside rear wheel 16 with the ground, the inside rear wheel 16 will be stationary, the truck 10 pivoting about the inside rear wheel 16. When the steering angle increases beyond this point, the inside read wheel 16 will rotate backwards.

While in the above embodiment only the front wheel 40 is driven, in an alternative embodiment, all three wheels 16,40 may be driven independently by individual electric motors. When all three wheels 16,40 are driven in this manner, the individual electric motors are preferably connected to a power source, in a manner such that under the forces generated by the drive applied to the front wheel 40 and outside rear wheel 16, the inside rear wheel 16 will automatically slow down as the steering angle increases and will eventually reverse, the power to the inside rear wheel 16 being automatically diverted to one or both of the other wheels 16,40.

Figure 6:
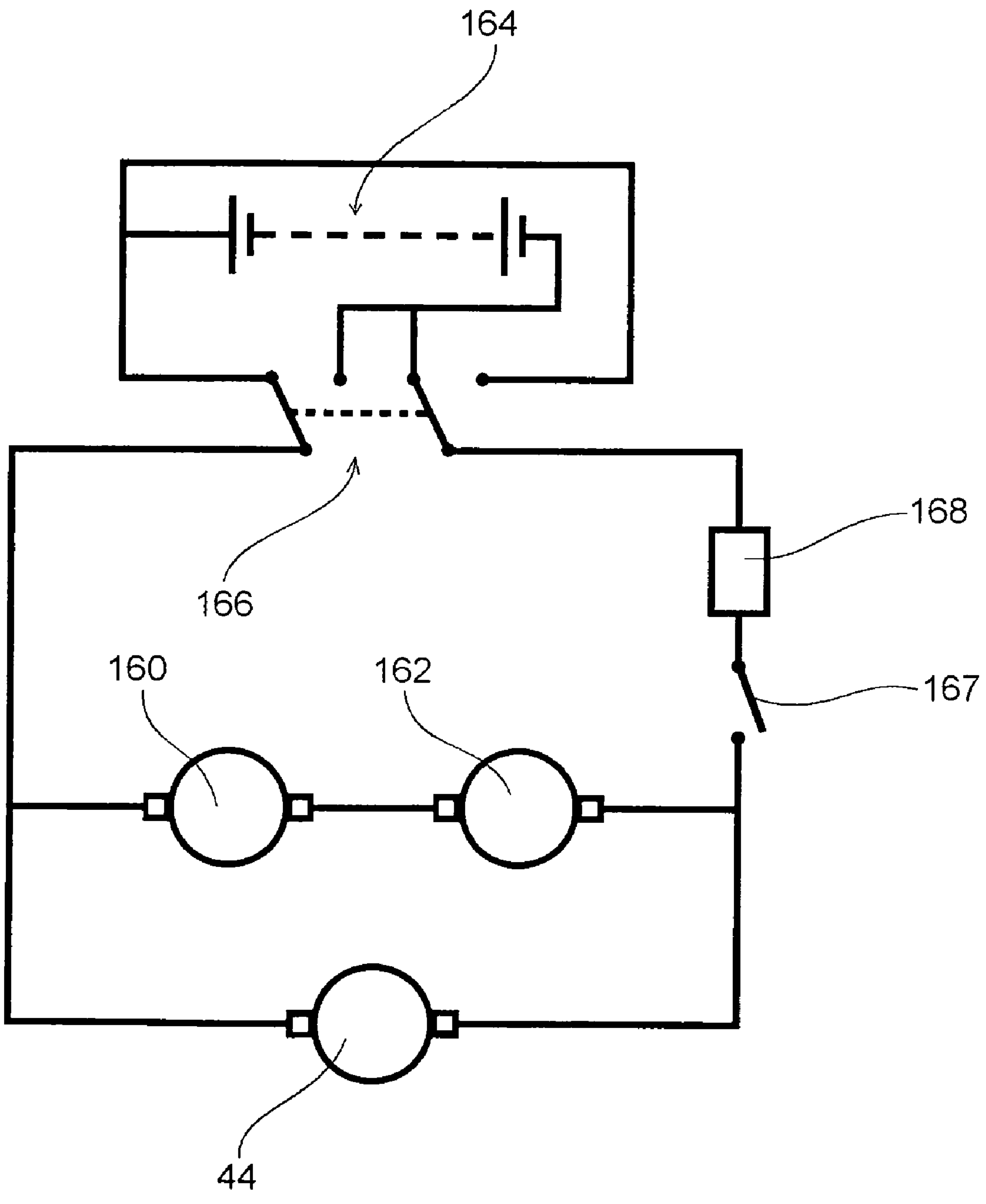
FIG. 6 is a circuit diagram for a three wheel drive lift truck in accordance with an alternative embodiment of the present invention.

For example, as illustrated in FIG. 6, electric motors 160, 162 powering the rear wheels 16 of a truck 10, may be connected in series, to a suitable power source 164, for example a battery or an engine driven generator. The electric motor 44 driving the front wheel 40, is connected to the power source 164, in parallel with the electric motors 160, 162. The power source 164 is connected to the motors 44, 160, 162, by switch means 66 by which the power may be reversed, to reverse the motors 44, 160, 162. The circuit also includes a start switch 167 and means 168 controlled by the drive control pedal 26, to control the speed of the motors 44, 160, 162.

With this arrangement, as the truck 10 turns, the increasing load applied to the inside rear wheel 16, causes the motor 60 driving that wheel 16 to slow down. This in turn causes an increase in the current in the circuit connecting motors 60, 62 and an increase in the torque applied by motor 62 to the outside rear wheel 16. The inside and outside rear wheels 16 will thus automatically run at different speeds, as the truck 10 turns.

According to a further embodiment, the motor 44 driving the front wheel 40, may also be connected in series with the motors 60, 62 driving the rear wheels 16, so that the torque applied to the front wheel 40 will also increase, as the truck 10 turns.

Figure 7:
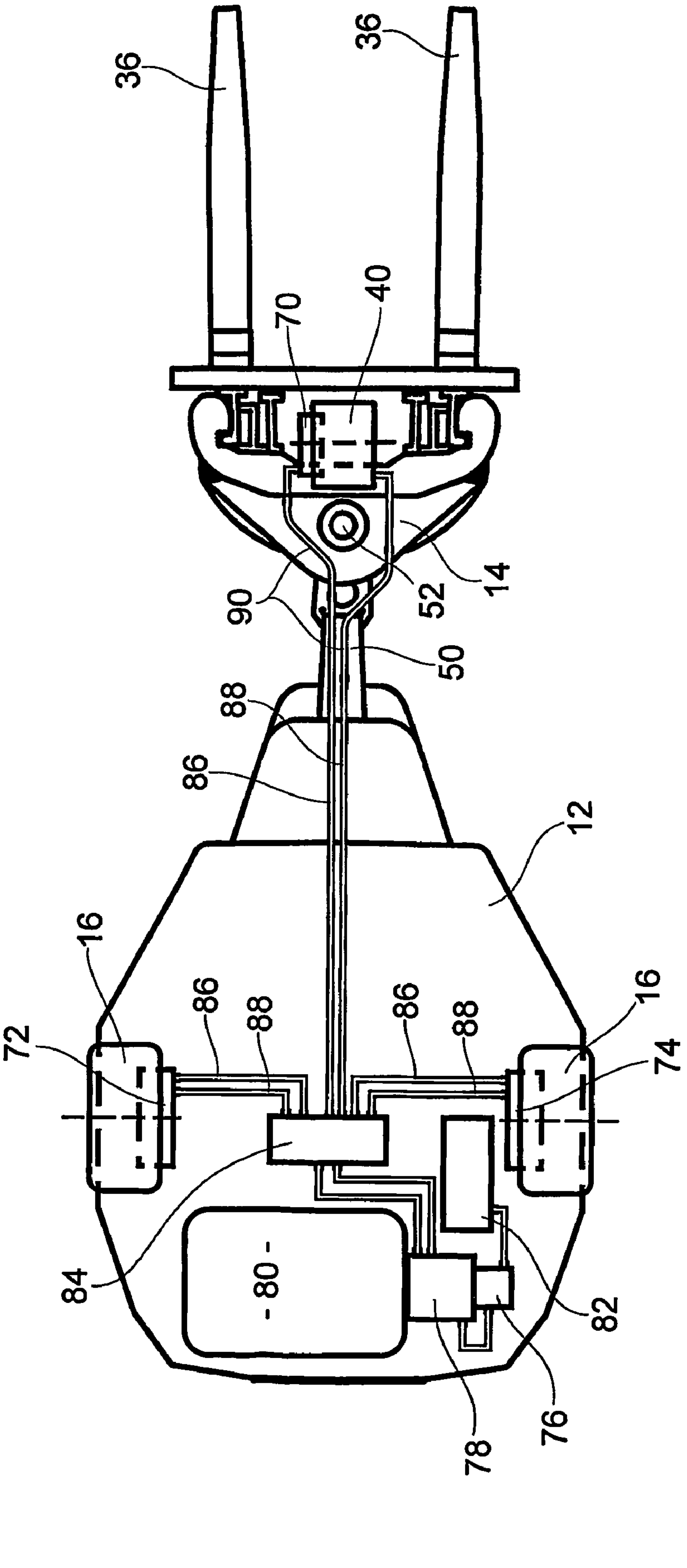
FIG. 7 is a diagrammatic plan view of an alternative embodiment of the invention.

In the embodiment illustrated in FIG. 7, the front and rear wheels 16,40 are driven by hydraulic motors 70, 72, 74, respectively. The hydraulic motors 70, 72, 74 are built into the hubs of the wheels 16,40. Hydraulic fluid is supplied under pressure to the hydraulic motors 70, 72, 74 by means of a hydraulic pumps 76,78 mounted in the truck body 12. The hydraulic pumps 76,78 are driven by an internal combustion engine 80 powered by a fuel gas or similar fuel. Hydraulic fluid is pumped from a reservoir 82, by means of a low pressure auxiliary pump 76, to a high pressure pump 78. A distribution block 84 is provided to permit automatic variation in the flow of hydraulic fluid to the motors 70, 72, 74 to control the speed and direction of the motors 70, 72, 74, by means of feed and return lines 86,88. Flexible hydraulic pressure hoses 90 are provided in the hydraulic lines 86,88 between the distribution block 84 and motor 70 driving the front wheel 40, in order to permit pivoting of the lifting mechanism 14.

The speed of the truck 10 is controlled by engine speed and adjusting the angle of the swash plate of pump 78. The direction of motion of the truck 10 is controlled by means of solenoids, which reverse the direction of flow in lines 86,88 from the pump 78.

Other systems of the fork lift truck 10, for example the steering, the mast extension means, lifting mechanism and means for tilting the mast, are powered by hydraulic fluid from independent source.

The hydraulic motors 72, 74 driving the rear wheels 16 of the truck 10 are connected to the pump 78 in series, so that as the inside rear wheel 16 slows down when the truck 10 is turning, the flow rate of fluid to the motor 72 driving that wheel 16 will reduce, while the flow rate of fluid to the motor 74 driving the outside rear wheel 16 will increase. The outside rear wheel 16 will thus be automatically driven at a speed greater than that of the inside rear wheel 16.

The hydraulic motor 70 driving the front wheel 40 may be connected to the pump 76 in series with the motors 72 and 74, or may be connected to the pump 78 or a separate pump, by a separate, parallel hydraulic circuit.

Various modifications may be made without departing from the invention. For example while in the embodiment described with reference to FIGS. 1 to 5, an electric motor is used to drive the front wheel, a hydraulic motor or other suitable drive means may be used. Similarly, in the three wheel drive embodiments described with reference to FIGS. 6 and 7, the electric or hydraulic motors may be replaced by other suitable drive means.

The present invention is also applicable to pedestrian operated fork lift trucks in which the operator walks behind the truck.

The invention claimed is:

1. A fork lift truck (10) comprising a lift truck body (12), a lift mechanism (14) connected to the lift truck body (12) by means of a vertically extending pivot (52) and means (24) for turning the lift mechanism (14) relative to the lift truck body (12) about said pivot (52) to steer the lift truck (10), an arm (50) extending from the lift truck body (12), a remote end of the arm (50) being coupled to the pivot assembly (52) such that the arm (50) distances the lift mechanism (14) from the turning means (24) and the lift truck body (12), the lift truck body (12) having a pair of rear ground engaging wheels (16) mounted on transverse axes, without any drive means being provided for driving the rear wheels (16), and the lifting mechanism (14) only having a single ground engaging front wheel (40) mounted centrally on a transverse axis, wherein a sole drive means (40, 46) is drivingly connected to the front wheel (40) only for driving the lift truck (10).

2. The fork lift truck (10) according to claim 1 wherein the lift mechanism (14) is pivoted to the lift truck body (12) at a steering angle of substantially 90° or more.

3. The fork lift truck (10) according to claim 1 wherein the front wheel (40) is positioned forwardly of the pivot connection (52) between the lift truck body (12) and the lifting mechanism (14).

4. The fork lift truck (10) according to claim 1 wherein the front wheel (40) is positioned as far forward as possible towards a load bearing part (36) of the lifting mechanism (14).

5. The fork lift truck (10) according to claim 1, wherein the single ground engaging front wheel (40) is driven by one of an hydraulic . and an electric motor (44).

6. The fork lift truck (10) according to claim 5, wherein the motor (44) is connected to the front wheel (40) by a gearbox (46).

7. The fork lift truck according to claim 5, wherein at least one of the motor (44) and the gearbox (46) is built partially into a hub of the front wheel (40).

8. The fork lift truck according to claim 5, wherein the power for the motor (44) is provided by one of an engine (80) driven generator, a hydraulic pump (76,78), and a battery pack (64).

9. The fork lift truck according to claim 8, wherein the engine (80) is an internal combustion engine powered by fuel gas.

10. A fork lift truck (10) only having a single drive means (44, 46) and three ground engaging wheels, the fork lift truck comprising a lift truck body (12) and a lift mechanism (14) connected to the lift truck body (12) by a vertically extending pivot (52), the lift truck body (12) having steering controls (24) for turning the lift mechanism (14), relative to the lift truck body (12), about the pivot (52), and steering the fork lift truck (10) during operation of the fork lift truck (10), an arm (50) extending from the lift truck body (12), a remote end of the arm (50) being coupled to the pivot assembly (52) such that the lift mechanism (14) is remote from the truck lift body (12) and the steering controls (24), the lift truck body (12) only having a pair of nondriven rear ground engaging wheels (16) and the lifting mechanism (14) only having a single front ground engaging wheel (40), the vertically extending pivot (52) being located between the pair of rear ground engaging wheels (16) and the single front ground engaging wheel (40) and the single drive means (44, 46) drives the fork lift truck (10) and the single drive means (44, 46) is only drivingly connected to the front wheel (40) while both of the rear wheels being nondriven.

11. A fork lift truck (10) only having a single drive (44, 46) and three ground engaging wheels, the fork lift truck comprising a lift truck body (12) and a lift mechanism (14), an arm (50) extends from the lift truck body (12) and has a remote end coupled to a vertically extending pivot assembly (52), the lift truck body (12) having steering controls (24) for turning the lift mechanism (14), relative to the lift truck body (12), about the pivot assembly (52), and steering the fork lift truck (10) during operation of the fork lift truck (10), the lift truck body (12) only having a pair of nondriven rear ground engaging wheels (16) and the lifting mechanism (14) only having a single front ground engaging wheel (40), the vertically extending pivot assembly (52) couples the remote end of the arm (50) and the lift mechanism (14) and holds the front ground engaging wheel (40), and only the single front ground engaging wheel (40) being driven by the single drive (44, 46) for maneuvering the lift truck (10) while both of the rear wheels always being nondriven.

12. The fork lift truck according to claim 11, wherein the fork lift truck (10) is only driven by the drive (44, 46), which is only connectable with the single front ground engaging wheel (40), such that only the single front ground engaging wheel (40) drives the fork lift truck (10).

* * * * *